United States Patent
Berry et al.

[11] Patent Number: 6,101,975
[45] Date of Patent: Aug. 15, 2000

[54] APPARATUS FOR FEEDING SWINE

[76] Inventors: Keith Berry, 4414 S. County Rd. 150W, Greencastle; Brian Berry, 4625 S. County Rd. 75W, Greencastle, both of Ind. 46135

[21] Appl. No.: 09/257,692

[22] Filed: Feb. 25, 1999

[51] Int. Cl.[7] .............................. A01K 1/10; A01K 5/00; A01K 39/00

[52] U.S. Cl. .......................... 119/53.5; 119/902; 119/54; 119/62; 119/75

[58] Field of Search .............................. 119/53.5, 54, 55, 119/62, 75, 76, 52.1, 52.4, 72.5, 53, 56.1, 57.1, 51.02, 902

[56] References Cited

U.S. PATENT DOCUMENTS

| | | | |
|---|---|---|---|
| 920,865 | 5/1909 | Hannibal | 119/902 |
| 1,587,775 | 6/1926 | Higgins | 119/53 |
| 3,019,765 | 2/1962 | Malloy, Sr. | 119/53 |
| 3,116,715 | 1/1964 | Krumheuer | 119/53 |
| 3,566,844 | 3/1971 | Occhiodori et al. | |
| 3,782,334 | 1/1974 | Leon et al. | 119/54 |
| 3,838,664 | 10/1974 | Atchley | 119/72.5 |
| 4,185,587 | 1/1980 | Kallin | 119/51.11 |
| 4,200,060 | 4/1980 | Daele | 119/56.2 |
| 4,348,988 | 9/1982 | Lawson | 119/53 |
| 4,799,455 | 1/1989 | O'Kelley | 119/51.01 |
| 4,993,365 | 2/1991 | Weerstra | 119/71 |
| 4,995,343 | 2/1991 | Cole et al. | 119/53 |
| 5,809,934 | 9/1998 | Gavet | 119/52.1 |
| 5,924,678 | 7/1999 | Olde . | |

*Primary Examiner*—Peter M. Poon
*Assistant Examiner*—Judith A. Nelson
*Attorney, Agent, or Firm*—Jack Schuman

[57] ABSTRACT

Feed hopper for a sow has opening at bottom surrounded by a seat upon which a ball check is adapted to rest, thereby to seal the opening and prevent the discharge of feed therethrough. A sow can nudge upwardly the ball check, unsealing the opening and permitting the discharge of feed from the hopper. Vertically adjustable means limit upward movement of the ball check so as to limit the maximum extent to which the opening can be unsealed. A water button, operatively connected to a source of water, can be nudged by the sow to discharge water for her.

4 Claims, 1 Drawing Sheet

APPARATUS FOR FEEDING SWINE

BACKGROUND OF THE INVENTION

1. Field of the Invention

This invention pertains to a novel and efficient means for feeding swine, e.g. sows.

2. Description of the Prior Art

Conventionally, in the raising of swine, e.g. sows, each sow is kept in an individual pit served by a hopper into which feed is introduced, such feed dropping out of the restricted bottom of the hopper into the pit, whether or not such feed is required by the sow.

Such conventional practice encourages spoilage of the feed and can be very wasteful.

SUMMARY OF THE INVENTION

One of the objects of this invention is to provide an improved and efficient apparatus for feeding swine.

Another of the objects of this invention is to provide swine feeding apparatus which furnishes, on demand of the sow, fresh feed and water.

Other and further objects of this invention will become apparent by reference to the accompanying specification and drawings, and to the appended claims.

Briefly, we have discovered that the foregoing objects may be attained by providing an adjustable ball check in the bottom of the hopper, which ball check ordinarily closes the bottom of the hopper, thereby preventing the discharge of feed from the hopper into the pit housing the sow, which ball check can be nudged upwardly by the sow, which is easily trained to perform this function, thereby to release feed from the hopper into the pit. We have also discovered that the foregoing objects may be attained by providing in the pit a water button connected to a source of fresh water, which water button can be nudged by the sow to discharge fresh water into a reservoir in the bottom of the pit.

DESCRIPTION OF THE DRAWINGS

Referring now to the drawings, in which like numerals represent like parts in the several views.

DESCRIPTION OF THE PREFERRED EMBODIMENT

Figure 1:
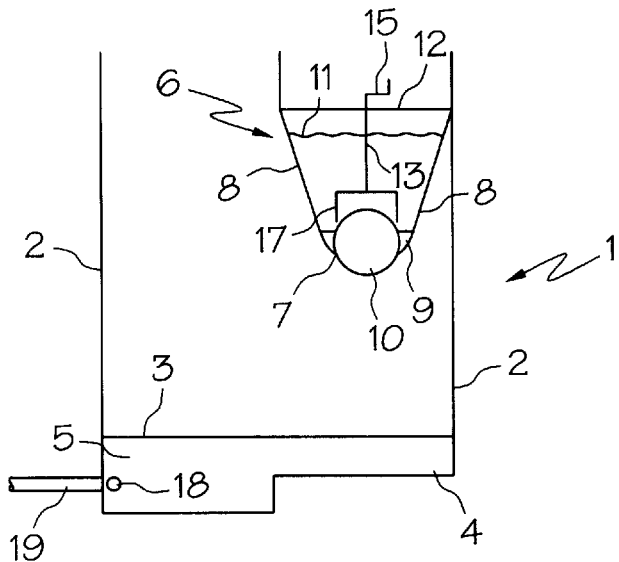
FIG. 1 represents diagrammatically a transverse cross-section of the pit, showing the feed hopper, the ball check, the feed trough in the bottom of the pit, and the water reservoir in the bottom of the pit.

Pit 1, having side walls 2 and floor 3, is provided with feed trough 4 in the form of a recess in floor 3, and with water trough 5 also in the form of a recess in floor 3.

Feed hopper 6 is mounted adjacent a side wall 2 of pit 1, and having a feed discharge opening 7 overlying the feed trough 4.

Figure 2:
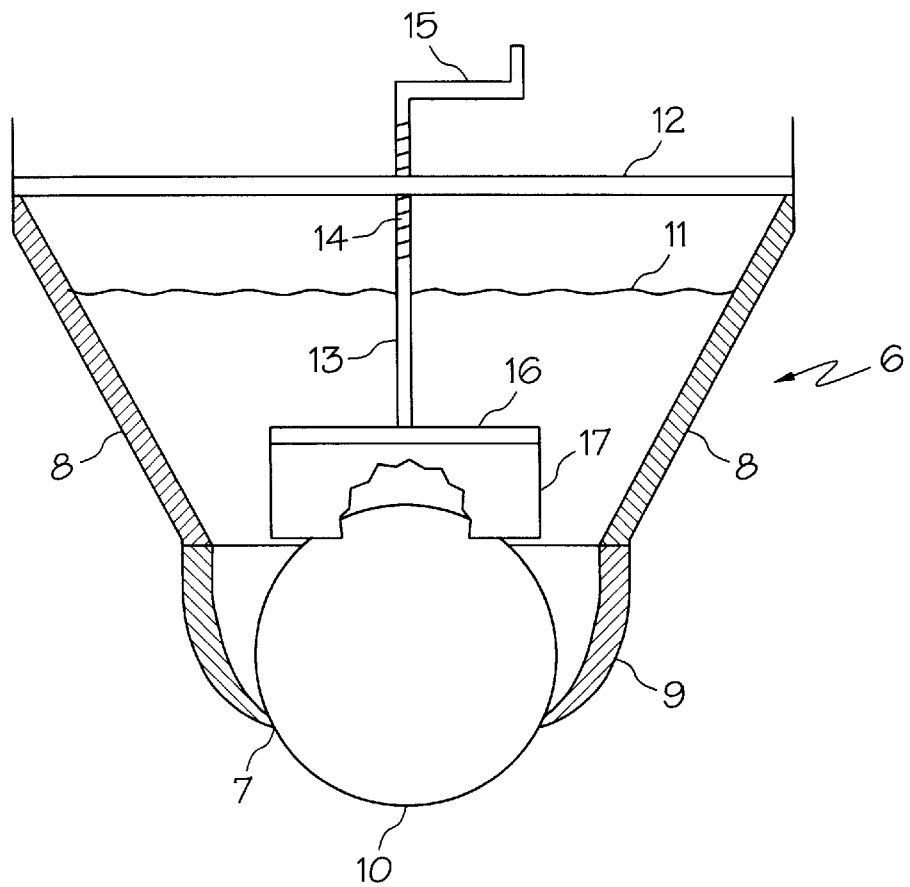
FIG. 2 represents diagrammatically in enlarged partial transverse cross-section the feed hopper, the ball check, and the means for adjusting the vertical travel of the ball check and hence the size of the opening through which feed is discharged from the feed hopper into the pit; the height-regulating circular drum shown in side elevation being partially broken away to show the top portion of the ball check.

As shown in detail in FIG. 2, feed hopper 6 has downwardly converging side walls 8 terminating in a bowl 9, the bottom of which bowl 9 provides the feed discharge opening 7.

Ballcheck 10 rests in bowl 9 over feed discharge opening 7, bowl 9 providing a seat for ball check 10, thus sealing feed discharge opening 7 and preventing feed 11 in feed hopper from exiting through feed discharge opening 7.

Mounted across feed hopper 6 is bar 12 having a central threaded aperture (not shown). Ball check adjustment shaft 13, having threads 14 formed thereon, extends through the central threaded aperture of bar 12. The upper extremity of ball check adjustment shaft 13 is provided with crank 15.

The bottom extremity of ball check adjustment shaft 13 is secured to circular plate 16 to which is mounted circular drum 17 adapted to engage the upper portion of ball check 10. It will be apparent that the vertical travel of ball check 10, and hence the area of the feed discharge opening 7, is determined by the height of circular drum 17. Rotation of crank 15 in one direction or in the opposite direction will raise or lower ball check adjustment shaft 13 because of the engagement of threads 14 with the central threaded aperture in bar 12, and thus raise or lower circular drum 17.

The sow is easily trained to nudge ball check 10 upwardly when hungry, thereby to unseat ball check 10 in bowl 9 and open feed discharge opening 7 to the extent limited by circular drum 17, so as to discharge feed 11 from feed hopper 6 into underlying feed trough 4. The vertical position of circular drum 17 can be adjusted to accommodate the requirements of particular sows, thereby to determine the maximum opening of feed discharge opening 7.

Water button 18 is part of a water valve serviced by fresh water line 19. The sow is easily trained to nudge against water button 18 when thirsty, thereby to discharge water from fresh water line 19 around the periphery of water button 18 into water trough 5.

There are a number of distinct advantages accruing from the use of the present invention, e.g.

(1) The sow can choose wet or dry feed.

(2) The sow is supplied with fresh feed and water on her demand.

(3) There is a substantial reduction of labor.

(4) The apparatus acts as a toy to reduce sow's boredom, and makes for a more content sow.

(5) Water is saved, because the sow does not waste as much as with conventional apparatus.

(6) Feed is saved, because of less spoilage.

(7) There is less water in the pit.

(8) The sow consumes more water, which virtually eliminates constipation, and increases feed intake.

(9) The apparatus works for any size sow, is easily adjusted, and reduces head and neck sores.

(10) The sow stays in better condition for faster breed-back.

Because modifications and changes which do not depart from the spirit of the invention as disclosed herein may occur to those skilled in the art to which this invention pertains, the appended claims should be construed as covering modifications and equivalents suitable to the practice of the invention.

We claim:

1. Apparatus for dispensing feed on demand to a swine, said apparatus comprising:

(a) a hopper adapted to contain feed for said swine and having an opening at the bottom thereof through which feed may be discharged from the hopper;

(b) a seat around the periphery of said opening at the bottom of said hopper;

(c) a vertically movable ball check in said hopper and adapted to rest on said seat thereby to seal said opening and prevent the discharge of feed from said hopper, said ball check further being adapted to be nudged upwardly by said swine thereby to unseal said opening and permit the discharge of feed from said hopper; and (d) a stop means comprising a circular drum positioned over said ball check, to limit the upward movement of said ball check thereby limiting the extent to which said opening is unsealed.

2. Apparatus as in claim 1, wherein:

(e) said stop means is adjustable thereby to adjust the maximum extent to which said opening can be unsealed.

3. Apparatus as in claim 1, wherein said stop means further comprises:

(e) a bar extending over said hopper and having a threaded aperture therethrough;

(f) a threaded shaft extending through said threaded aperture and secured at its lower extremity to the center of said circular drum;

(g) a crank at the upper extremity of said threaded shaft (h) whereby rotation of said crank will rotate said threaded shaft and adjust the vertical position of said circular drum.

4. Apparatus as in claim 1, further comprising:

(e) a feed trough below said opening in said hopper and adapted to receive feed discharged from said hopper, (f) a source of water, (g) a water trough, (h) a water button operatively connected to said source of water and adapted to be nudged by said swine to deliver water from said water source to said water trough.

* * * * *